J. F. BUCKINGHAM.
LIVE AXLE AND COUNTERSHAFT FOR MOTOR VEHICLES.
APPLICATION FILED JUNE 29, 1920.
1,381,063.
Patented June 7, 1921.
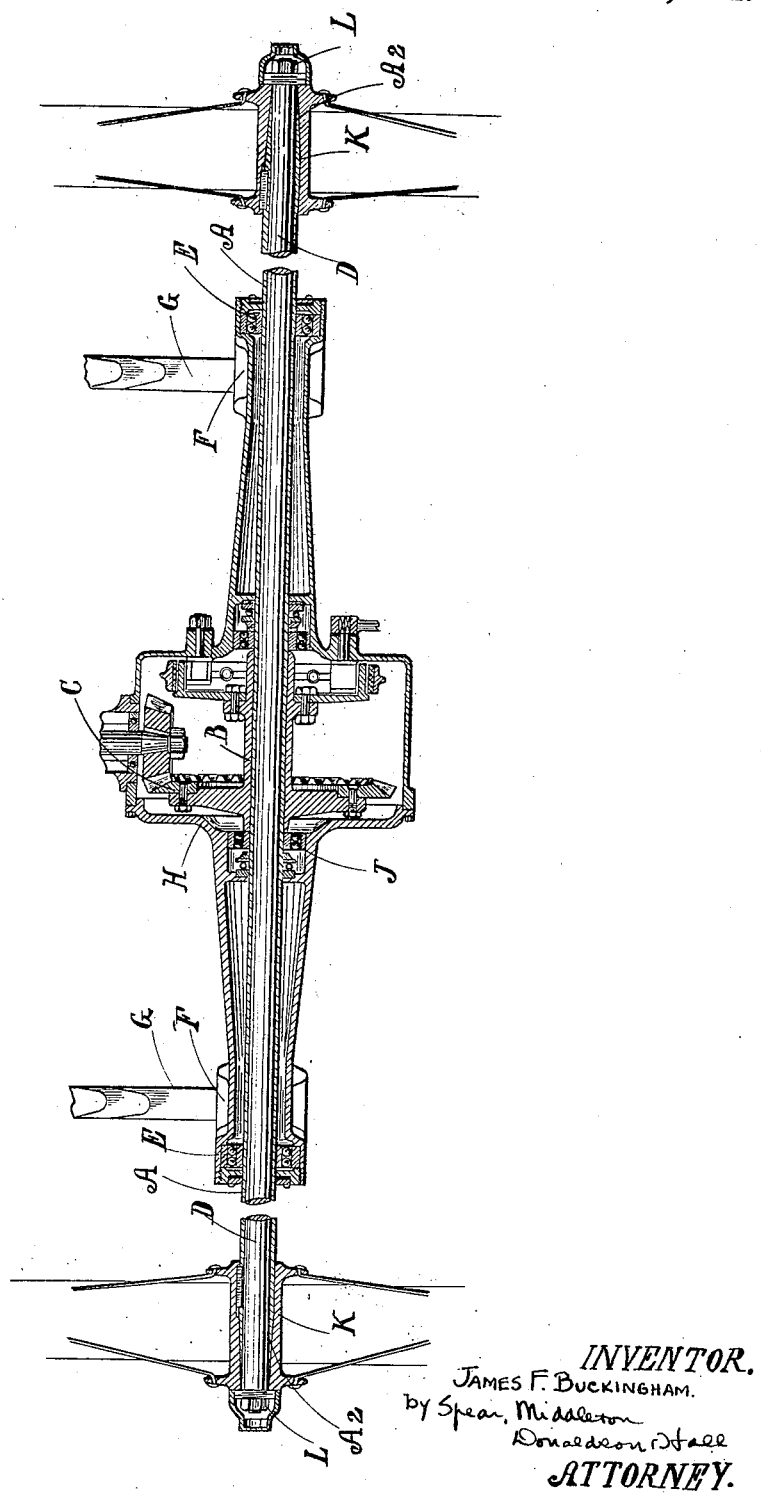
INVENTOR.
JAMES F. BUCKINGHAM.
by Spear, Middleton
Donaldson Hall
ATTORNEY.

UNITED STATES PATENT OFFICE.

JAMES FRANK BUCKINGHAM, OF COVENTRY, ENGLAND.

LIVE AXLE AND COUNTERSHAFT FOR MOTOR-VEHICLES.

1,381,063. Specification of Letters Patent. Patented June 7, 1921.

Application filed June 29, 1920. Serial No. 392,615.

*To all whom it may concern:*

Be it known that I, JAMES FRANK BUCKINGHAM, a subject of the King of England, residing at Coventry, in the county of Warwick, England, have invented certain new and useful Improvements in Live Axles and Countershafts for Motor-Vehicles, of which the following is a specification.

This invention relates to live axles and countershafts for use on motor vehicles, of the kind in which the gear wheel to which the power is transmitted is fixed mechanically or otherwise to a shaft or axle intermediate of its ends, as for example is the case with a live axle having no differential gear. The main object is to provide a construction in which the load and torsional stresses are taken by separate members.

Furthermore, if the shaft is constituted by a plain length of tube, the gear wheel is usually attached to or integral with a carrier, such as a sleeve, which is welded or brazed to the tube. The heat used for this brazing or the like affects the strength of the tube from a load-carrying point of view, but by the present invention this reduction of strength is overcome and a simple construction of axle is produced.

The accompanying drawing is a longitudinal section of a "live" axle constructed in accordance with this invention.

The outer shaft is shown at A having brazed or welded to it the carrier B to which the driven bevel wheel C is bolted. Through this shaft extends the inner shaft D, preferably of some alloy steel such as a nickel steel, while the material used for the outer shaft is one suitable for brazing to the carrier B.

The shaft D may be a push fit in the outer one A and the outer may carry at each end a bearing E for a spring platform F or other attachment for a leaf spring G.

These platforms may be integral with a casing H containing the gear wheel C and other bearings J may be fitted between the casing and the shaft A near the gear wheel carrier B.

At each end the outer shaft A may be tapered at $A^2$ for the fitting of the road wheel hubs K. On the ends of the shaft D are nuts L which hold the hubs on their tapers.

Thus a strong and simple construction is obtained, in which the outer shaft A transmits most or all of the drive and the inner D takes most or all of the load.

What I claim as my invention and desire to secure by Letters Patent of the United States is:—

1. In an axle or countershaft, a tubular driving shaft, driving and driven elements attached thereto, said driving shaft being continuous between driven elements, a load carrying shaft frictionally engaging and inclosed within said tubular driving shaft, so that the said shafts revolve as a unit substantially as set forth.

2. In an axle or countershaft, a tubular driving shaft, a driving element attached thereto, a driven element mounted upon each end of said driving shaft, a load carrying shaft frictionally engaging and inclosed within and extending from end to end of said driving shaft, devices on said load carrying shaft securing said driven elements on said driving shaft, substantally as set forth.

In testimony whereof I have signed my name to this specification in the presence of two subscribing witnesses.

JAMES FRANK BUCKINGHAM.

Witnesses:
ALBERT BROWN,
ANNIE L. WADE.